March 26, 1963  G. A. JENSEN ET AL  3,082,846
SHOCK ABSORBING DEVICE
Filed July 1, 1959  3 Sheets-Sheet 1

GERALD A. JENSEN
JAMES G. KAKATSAKIS
ANTHONY SCIOLA
INVENTORS

BY
ATTORNEYS

March 26, 1963  G. A. JENSEN ETAL  3,082,846
SHOCK ABSORBING DEVICE
Filed July 1, 1959  3 Sheets-Sheet 2

GERALD A. JENSEN
JAMES G. KAKATSAKIS
ANTHONY SCIOLA
INVENTORS

BY Alden D. Redfield
Abraham Ogman
ATTORNEYS

March 26, 1963     G. A. JENSEN ETAL     3,082,846
SHOCK ABSORBING DEVICE

Filed July 1, 1959     3 Sheets-Sheet 3

GERALD A. JENSEN
JAMES G. KAKATSAKIS
ANTHONY SCIOLA
*INVENTORS*

BY

ATTORNEYS though the following description of a specific embodiment when
United States Patent Office
3,082,846
Patented Mar. 26, 1963

3,082,846
SHOCK ABSORBING DEVICE
Gerald A. Jensen, Lowell, James G. Kakatsakis, Needham Heights, and Anthony Sciola, Everett, Mass., assignors to Avco Corporation, Cincinnati, Ohio, a corporation of Delaware
Filed July 1, 1959, Ser. No. 824,243
6 Claims. (Cl. 188—1)

This invention relates to a shock absorbing device for decelerating a moving mass. In particular, this invention relates to a shock absorbing device for subjecting the moving body to a constant deceleration.

With the recent emphasis on rocket propelled vehicles and objects, it has become increasingly important to simulate in the laboratory the shock conditions experienced by rocket propelled objects. The simulated shock environment is used to test the ability of components and equipments to withstand conditions under which they will be called upon to operate.

Rocket propelled objects accelerate very rapidly from zero acceleration to a maximum acceleration. The acceleration is then maintained constant at the maximum value for the duration of the rocket burst; the acceleration then falls rapidly to zero. In the vernacular, this type of acceleration response is called a square or a rectangular shock pulse.

Heretofore, industry has spent a great deal of time and money in trying to simulate a square wave acceleration condition. As will be shown hereinafter, a faithful reproduction of the shock wave is important since minor variations in the shape of the square wave will greatly affect the response of the component or equipment being tested. The most significant aspects of the square wave shock pulse are the rise time, or the time it takes for the mass to accelerate from zero to a maximum value, and the contour of the flat position of the shock pulse.

It is well known that a mass undergoing acceleration is affected in the same way as the same mass undergoing a like deceleration. In rocket applications the rocket, and the equipment included therein, are accelerated from zero to some maximum value. In the laboratory, however, it is much simpler to provide a controlled deceleration and, for this reason, components and equipments are usually decelerated. The present invention is directed to a shock absorbing device for decelerating a moving mass at some constant deceleration level.

Past efforts to produce a rectangular deceleration condition in the laboratory have resulted in the production of deceleration pulses which have relatively slow rising leading edges and a disturbing quantity of spurious vibration signals, commonly called hash, on the flat portion of the pulse. The effect each of these factors has on the test specimen will be discussed hereinafter. It is also well to point out that a principal limitation of known shock testing equipment is their inability to repeatedly reproduce a specific rectangular shock pulse, particularly with respect to the hash. It is extremely important where reliability of a component is being determined that the test conditions be reliably and repeatedly reproducible, particularly where components will be tested in different laboratory facilities.

It is an object of this invention to provide a shock absorbing device for subjecting a moving mass to a constant deceleration.

It is another object of the invention to provide a shock absorbing device which resists an impact from a moving mass with a substantially constant force.

It is stil lanother object of the invention to provide a shock absorbing device having walls which deform and deflect laterally in order to resist an impact from a moving body with a constant force.

It is a further object of the invention to provide a shock absorbing device which includes provision for minimizing spurious high frequency forces from being applied to an object being decelerated.

It is still another object of the invention to provide a shock absorbing device which provides means for reliably and repeatedly producing a predetermined shock pulse.

Finally, it is an object of the invention to provide a shock absorbing device which may be mass produced at extremely low cost.

A shock absorbing device adapted to be impacted by a moving mass for subjecting the moving mass to a constant deceleration comprises a peripheral wall extending generally in the direction of the impact. The peripheral wall defines, generally, a short hollow cylindrical member having an upper and lower marginal edge. When the shock absorbing device is impacted by the moving mass, the peripheral wall deflects laterally and resists the accelerated mass with a constant force. The upper marginal edge is chamfered for minimizing the introduction of spurious high frequency forces into the mass being decelerated.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
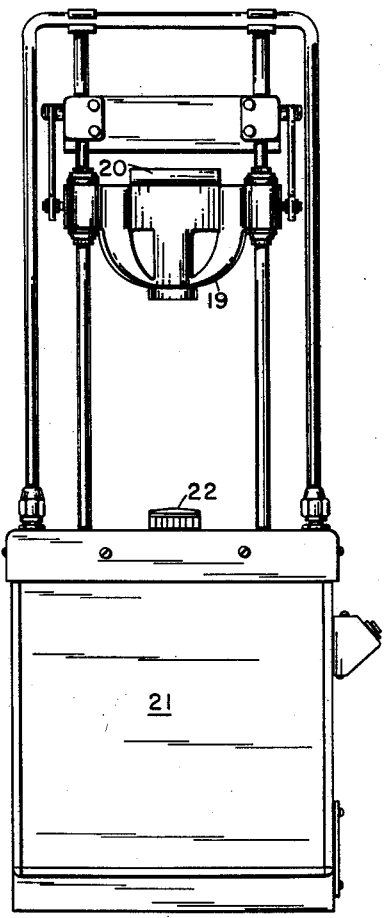
FIG. 1 is a side view of one form of shock testing machine adapted to utilize the shock absorbing device discussed herein.

One form of laboratory shock testing equipment is shown in FIG. 1. The shock testing machine comprises a carriage 19 and a base 21. A test mass 20 is mounted to the carriage and accelerated by a controlled free fall. The carriage 19 with test mass 20 eventually strike the base and are decelerated to rest.

To control the deceleration of the carriage 19 and the test mass 20, a shock absorbing device 22 is placed between the carriage 20 and the base 21 to receive the initial impact and then to absorb the kinetic energy of the falling masses. The resisting forces generated during its collapse control the deceleration of the carriage 19 and the test mass 20.

Where the test mass is a composite equipment, the individual components constituting the equipment are shock excited into vibrating at a specific characteristic frequency. In many cases the amplitude of these vibrations will not be perceptible to the eye but can be easily ascertained with measuring equipment. Accompanying the vibration, is a stress which tests the strength of components and the composite equipment. The frequency at which the mass vibrates is called its resonant frequency.

The resonant frequency may be determined by vibrating the mass through a range of frequencies. When frequency of the applied vibration is equal to the resonant frequency of the mass, the mass resonates; its amplitude of vibration greatly exceeds the applied amplitude. The amplitude of vibration developed in the mass relative to the applied vibration amplitude is a function of the damping factors associated with the mass, its mountings, and construction, for example. The over-all effective damping factor of the mass is usually expressed as a multiplication factor "Q," the derivation of which is not important for this discussion. "Q" can vary over wide limits. "Q's" of 10 are very common and "Q's" of 100 have been observed occasionally.

Figure 2:
FIG. 2 is a schematic representation of a test object.
Figure 3:
FIG. 3 is a curve representing an ideal rectangular deceleration pulse.

Schematically, a vibrating system can be represented by a mass M suspended on the free end of a cantilevered reed R, the other end of which is fastened to a rigid body G. See FIG. 2. Before impact, the reed R with the mass M attached thereto extends horizontally from the rigid body G as shown in the dashed schematic representation in FIG. 2. The mass M is shock excited by the transfer of an impact to it from the rigid body G. When the rigid body G is shock excited by a rectangular deceleration pulse as depicted in FIG. 3, the mass M and the reed R are suddenly deflected downwardly in proportion to the magnitude of the shock pulse. The maximum deflection of the mass M is also a function of its resonant frequency. After the initial deflection the mass M vibrates relative to the rigid body until the vibrations are damped out. The frequency of vibration is determined by the rigidity of the mass and reed; a rigid member tends to vibrate at a much higher frequency than a flexible member.

Figure 4:
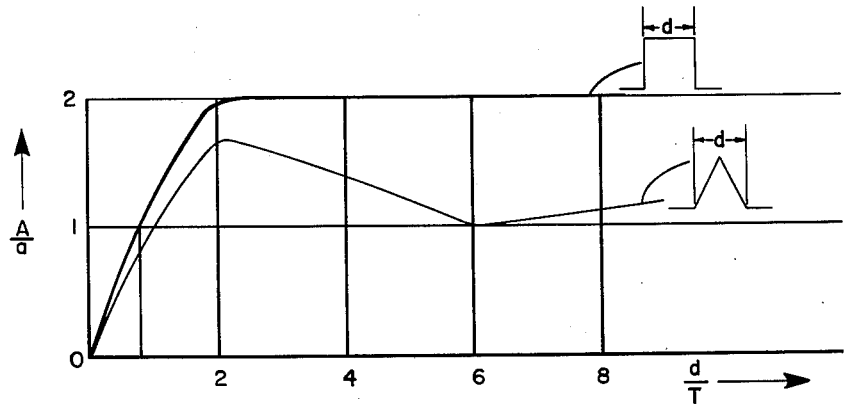
FIG. 4 is a curve useful in describing the invention.

Referring briefly to FIG. 4 of the drawings, there is represented therein the primary shock spectra for two forms of deceleration pulses. The primary shock spectra is a curve of the miximum initial deceleration a mass is subjected to as a function of its resonant frequency for a specific shock excitation. The abscissa of FIG. 4 is the ratio of "$d$"/$T$ where "$d$" is the duration of the applied pulse (time) and "$T$" the natural period (time) of the mass, the natural period being the time it takes for the mass to vibrate through one complete cycle. The ordinate is the ratio of "$A$"/$a$ where "$A$" represents the maximum deceleration developed in the mass and "$a$" represents the applied deceleration. The "$A$"/$a$ ratio, representing the initial deceleration, is independent of the "Q" of the mass. It will be noted that for a rectangular pulse of duration "$d$" the acceleration of all masses having a resonant period "$T$" equal to or less than "$d$"/2 are accelerated to a value equal to twice the value of the applied shock pulse. Where the ratio of "$d$"/$T$ is less than two, the mass is accelerated to a value less than twice the applied value.

In a similar manner, it will be noted in the curve depicting spectra for a triangular pulse of duration "$d$," the maximum acceleration induced in a mass is less than 2 when "$d$"/$T$ equals 2 and falls off rapidly to about 1 at "$d$"/$T$ equals 6, and thereafter. These two curves illustrate the relative effects of distinctly different rise times.

The FIG. 4 curve for the triangle is typical of a class of shock pulses that does not have steep fronts. They do not subject a mass to the levels of acceleration which are obtained with a rectangular applied pulse. Since the rectangular pulse is representative of the conditions found in small rockets of all types and large solid propellent vehicles, is is important to reproduce this steep front in any laboratory test of components and equipment.

Figure 5:
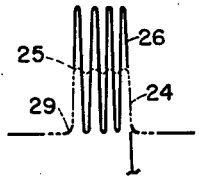
FIG. 5 is a curve representing the response of one such test object whose vibration period is substantially smaller than the duration of a deceleration pulse.

In FIG. 5 of the drawings, there is a graphical representation of a known idealized deceleration pulse and the response of a mass thereto where the "$d$"/$T$ ratio is more than 2. The deceleration pulse is shown in the dot-dash outline 24. Instead of the idealized flat portion, a sinusoidal signal 25, depicting a component of a spurious signal or hash, is superimposed on the rectangular deceleration pulse. Generally, the spurious signal is a random signal comprising a great many sinusoidal components covering a wide range of frequencies. A particular sinusoidal component of the random signal is shown to facilitate this discussion.

Also, in FIG. 5 the graphical representation of the response to a mass being tested is designated 26. Since the "$d$"/$T$ ratio has been assumed to be greater than 2, the maximum acceleration obtained by the test mass is equal to twice the applied acceleration. This follows from the relationship shown in FIG. 4 of the drawings. The resonant period of the mass being considered, is smaller than the duration of the applied deceleration pulse and, as a consequence, the mass undergoes several cycles of vibration during the interval of the applied acceleration pulse.

An illustrative example will be cited to show the effect of the spurious signal in the deceleration pulse on the mass being tested. The mass will be assumed to have a resonant frequency of 2000 cycles and the duration of the deceleration pulse will be assumed to be 10 milliseconds. Thus, the "$d$"/$T$ ratio is substantially greater than 1 and the condition shown in FIG. 5 may be said to be representative of the mass now being considered. Furthermore, the applied pulse will be assumed to have a magnitude of 50 times the acceleration of gravity, or, in the vernacular, 50 $g$'s. The positive and negative peak amplitudes of the spurious signal superimposed on the deceleration pulse is about 10% of the magnitude of the deceleration pulse, or ±5 $g$'s.

If the applied deceleration pulse is considered to be ideal, a 2000 cycle mass will, from FIG. 4, undergo an initial acceleration of twice the input acceleration, or 100 $g$'s. An acceleration of 100 $g$'s represents a displacement of the mass, from its normal accelerated condition, of 475 microinches. The 5 $g$ acceleration, attributable to the spurious signal 25 on the applied deceleration pulse represents, at 2000 cycles per second, a displacement of 30 microinches. It will be recalled, however, that the 5 $g$ acceleration is a vibration, not a shock, phenomenon introduced into the test mass by the test equipment. If, as is often the case, the mass has a "Q," or amplification factor, of 10, the additional displacement due to the 30 microinch vibration displacement will equal 300 microinches, or more than half of the displacement induced in the mass by the applied shock pulse. A "Q" of 20 will cause a 600 microinch displacement or more than the displacement caused by the applied shock pulse. The shock and vibration displacements are additive. Thus, the stresses resulting form the displacements are additive and the test results are often disastrous. Experience has shown that masses frequently have "Q's" of 10 and at times "Q's" of 100 have been observed. It is thus seen that the effect of spurious signals on the applied pulse can materially alter the acceleration response, of certain masses, to a shock pulse.

If it were possible to predict the magnitude of the spurious signals, it would be a relatively simple matter to compensate for it. However, the principal difficulties with spurious signals of this type are: (1) their magnitude is unpredictable, (2) their frequency cannot be anticipated and (3) they cannot be reliably reproduced. Thus, an important consideration in testing the reliability of components and equipment under shock is to reduce the amount of spurious signals generated by the test equipment so that meaningful data can be obtained. The present invention recognizes the importance of producing a steep front for accurately simulating rocket conditions, and it also makes provision for minimizing the amount of spurious signals which are superimposed on the applied shock pulse.

Shock absorbing devices embodying the principles of the present invention are shown in FIGS. 6–14. It follows from the well known relationship between force and acceleration, $F=ma$, that a constant deceleration is achieved by resisting the impact of the moving mass by a constant force. In accordance with this invention, shock absorbing devices are designed to have walls which deform laterally under impact; the lateral deformation having the effect of maintaining a constant cross sectional area transverse to the direction of the impact, thus providing a constant resisting force. The basic difference between a linear spring and the shock absorbing device under consideration is that the latter absorbs energy when deforming. The spring temporarily stores energy.

There will be described hereinafter two basic forms of impact absorbing devices which provide walls that will deform laterally under impact. The first utilizes the characteristic of ductile materials to deform laterally when compressed. The second type utilizes, in addition, the tendency for thin-walled columns to deflect laterally, buckle or wrinkle, under a compressive load.

Figure 6:
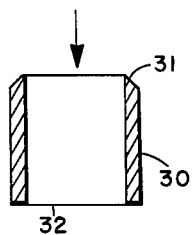
FIG. 6 is a cross sectional representation of a rudimentary form of a shock absorbing device embodying the principles of this invention.
Figure 7:
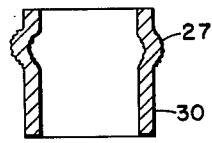
FIG. 7 is a cross sectional representation of a shock absorbing device after it has received an impact.
Figure 8:
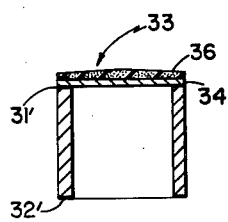
FIG. 8 is another form of a shock absorbing device embodying the principles of the present invention.

Referring to FIGS. 6 through 8 of the drawings there are represented impact absorbing devices embodying the principles of the first basic form of the present invention. The impact absorbing device comprises a peripheral wall 30, generally cylindrical in shape, having upper and lower marginal edges 31 and 32 respectively. It is formed out of a ductile material preferably lead or a material having about the same ductility. Edge 31 is chamfered downwardly and outwardly. In the alternative the chamfer on the upper marginal edge 31 can be directed downwardly and towards the center of the shock absorbing device. The peripheral wall 30 extends generally toward the direction of the intended impact which is designated by an arrow.

The impact of an accelerated moving mass is first applied to the upper marginal edge 31. Because of the chamfer, a short but nevetheless finite time is required before the impact is brought to bear on the full cross sectional area of the peripheral wall 30. The changing area in the initial stages of the impact causes a rounding off of the deceleration pulse at 29 in FIG. 5 The rounding off of the leading edge of the shock pulse substantially reduces the magnitude of the spurious signals which are developed.

The impact to the peripheral wall 30 causes it to buckle or deform laterally as shown at 27 in FIG. 7. It will be noted that because the peripheral wall 30 deforms laterally, the minimum cross sectional area transverse to the direction of impact, remains the original cross sectional area of the shown absorbing device. It is equally well known that the stress representing the force applied to a ductile material divided by the material cross sectional area remains susbtantially constant if the material is stressed above its yield point. This condition is present in the shock absorbing device under consideration. Consequently, if the stress is constant, and the cross sectional area is maintained at a constant value, the resistant force must be a constant value.

In FIG. 8 of the drawings there is shown a shock absorbing device of a modified type which embodies the principles of the present invention. It has been found, through extensive experimentation, that the magnitude of the spurious signals can be further reduced if a resilient impact device is substituted for the chamfered edge 31. Accordingly, the impact absorbing device may be constructed with parallel upper and lower faces 31' and 32', respectively, and used with an impact device 33. The impact device 33 is seated on the upper face 31' to receive the initial blow of the moving mass. It comprises a nondeformable plate 34 which underlies in an abutting relationship a resilient member 36, formed from rubber or a like resilient material. The top surface of the resilient member 36 is conical to provide a changing cross sectional area for a short time after the initial impact, for rounding out the start of the deceleration pulse as previously described. The resilient member absorbs the initial impact until the force transmitted through it to the shock absorbing device causes the stress in the latter to exceed its yield point, at which time the shock absorbing device collapses. It is well known that resilient devices generally absorb shock in a nonlinear manner; thus, the rounding off of the shock pulse is easily accomplished.

Figure 9:
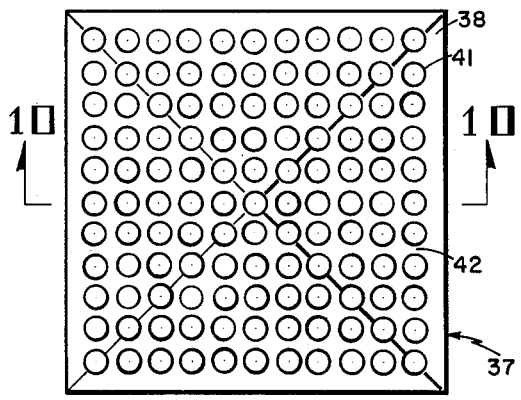
FIG. 9 is a representation of another form of shock absorbing device.
Figure 10:
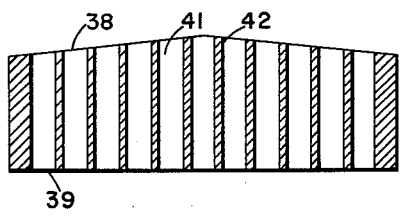
FIG. 10 is a cross sectional representation taken along line 10—10 in FIG. 9.

The basic concept of a shock absorbing device having laterally deformable walls has been incorporated in another form, shown in FIGS. 9 and 10. It is intended that this shock absorbing device be used to absorb extremely high impacts. This device, generally designated 37, comprises a block of ductile material, preferably lead, having an upper and a lower face, 38 and 39 respectively. The shock absorbing device 37 is shown to have a square cross section, but it is obvious that it may also be constructed in the form of a cylinder, or any other suitable shape.

The upper face 38 comprises a plurality of laterally inclined surfaces which tend to converge to an apex. Defined within the shock absorbing device 37 are a plurality of horizontally spaced vertically extending passages 41. Passages 41 extend through the entire block from the lower face 39 to the upper face 38, and they are divided by walls 42. The diameters of passages 41 are not critical but they should be sufficiently large to permit the walls 42 to deform laterally, in the manner heretofore described, without coming into contact with an adjacent wall. In this manner, the shock absorbing device 37 will present a constant resisting force when crushed by an impact. The surfaces comprising upper face 38 converge to an apex in order to reduce the amount of spurious signals induced in the accelerated mass in the same manner that the chamfered edge accomplished this result on the hollow cylindrical device. Obviously, the upper face 38 may be made parallel to the lower face 39 and an impact device comprising a plate and a resilient member may be substituted for the inclined surfaces.

The second form of construction, using the thin-walled column principle, is shown in FIGS. 11 through 14 of the drawings. It is well known that a thin-walled column under an excessive axial compressive load will buckle, or wrinkle. In doing so, it deflects laterally and resists the compressive load with a constant force.

Figure 11:
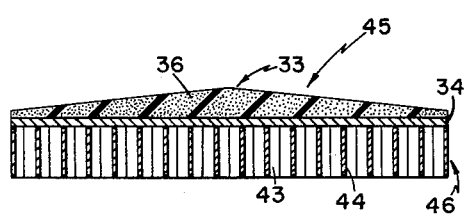
FIG. 11 is a cross sectional representation of a shock absorbing device embodying the principles of the present invention and of still another distinctive design.
Figure 12:
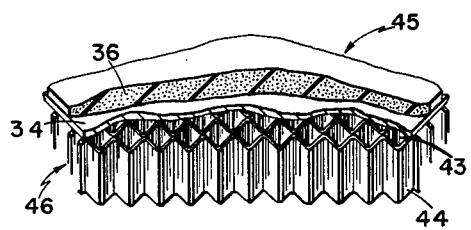
FIG. 12 is a fragmentary pictorial representation of the FIG. 11 shock absorbing device showing the details of its construction.

The shock absorbing device 45 shown in FIGS. 11 through 14 of this application takes advantage of this characteristic of thin-walled columns to provide means for generating a constant deceleration pulse. In FIG. 11 the shock absorbing device 45 is shown in cross section. It will be noted that it includes a body member 46 having a plurality of passages 43 extending through the depth thereof. The passages 43 are separated by a plurality of wall sections 44. Referring briefly to FIG. 12 of the drawings, it is seen that the wall sections 44 undulate to form a corrugated type construction. The body member 46 is constructed by abutting a plurality of these wall sections 44 defining a plurality of passages 43 therebetween. Experience has shown that it is not economical to provide the shock absorbing device of this type with laterally inclined top surfaces, and accordingly, there is provided a shock absorbing device 33, of the type previously discussed, comprising a plate 34 and a resilient member 36, overlying the top surface of the body member 46.

The ratio of the thickness of each of the wall sections 44 to their height is such that the peripheral wall, defining a particular passage 43, comprises a thin-walled column, in its common concept. The wall sections 44 are designed to fail by wrinkling, in a manner similar to the failure of a thin-walled column being compressed.

Figure 13:
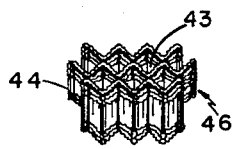
FIG. 13 is a fragmentary pictorial representation of the exterior of the FIG. 11 shock impact device after it has been impacted.
Figure 14:
FIG. 14 is a fragmentary pictorial representation of the interior of the FIG. 11 shock impact device after it has been impacted.

When the shock absorbing device 45 is subjected to a compressive force developed by the impact of the moving mass, the walls 44 collapse in an accordion-like fashion which is typical of a wrinkle type failure. In FIG. 13 of the drawings there is shown a fragmentary portion of the body member 46 which has absorbed the impact of a moving mass. FIG. 14 shows the interior of the FIG. 13 portion showing the wrinkled contour of the far wall section.

The wall sections 44 are formed from a ductile material which is capable of being deformed with the fracturing. Many such materials exist, and two materials that have been highly successful are stainless steel and Inconel.

Manifestly, the dimensions of the shock absorbing device described herein will be a function of the energy to be absorbed. In particular, the height of the shock absorbing device must be sufficient to enable it to absorb all of the energy of the moving mass without developing a change in its resisting force. The resisting force will change if the impact completely demolishes the shock absorbing device and changes the area resisting the impact. In practice, it has been found that the volume of material contained in a shock absorbing device is constant for a specific magnitude of energy that is to be absorbed. Accordingly, it has been possible to vary both the height and the wall thickness of the shock absorbing device to optimize its ability to subject a moving mass to a constant deceleration.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A shock absorbing device for subjecting a moving mass to a constant deceleration comprising: a peripheral wall defining a passage and having a substantially uniform cross sectional area, said peripheral wall for deforming inelastically laterally for resisting the moving mass with a constant force, said peripheral wall further having upper and lower marginal edges, said upper marginal edge being chamfered for developing an increasing resisting force when struck and compressed.

2. A shock absorbing device as described in claim 1 in which said peripheral wall defines a hollow cylinder.

3. A shock absorbing device for subjecting a moving mass to a constant deceleration comprising: a block of permanently deformable material having substantially uniform cross-sectional area for developing a constant resisting force when compressed by the impact of the moving mass, said block having at least one passage extending through the block in the direction of impact defined by a wall member chamfered to form a sloping upper marginal edge determining the block upper surface, said block upper surface being inclined relative to the direction of impact.

4. An impact absorbing device as described in claim 3 in which said wall members comprise a plurality of abutting undulating wall sections defining a plurality of passages therebetween, each of said wall members comprising a slender column permitting it to deflect and deform laterally when compressed by an impact of the moving mass.

5. An impact absorbing device as described in claim 3 in which said walls are made of a ductile material permitting said walls to yield laterally under the compressive force of an impact.

6. An impact absorbing device as described in claim 3 in which said upper surface of said block comprises laterally inclined surfaces tending to converge at an apex.

References Cited in the file of this patent

UNITED STATES PATENTS

| | | |
|---|---|---|
| 2,728,479 | Wheeler | Dec. 27, 1955 |
| 2,732,040 | De Vost et al. | Jan. 24, 1956 |
| 2,732,040 | DeVost et al. | Jan. 24, 1956 |
| 2,870,871 | Stevinson | Jan. 27, 1959 |
| 2,890,766 | Sargeant | June 16, 1959 |